Oct. 13, 1964
N. H. BERLIN ETAL
3,152,981
HYDROGENATION PROCESS EMPLOYING HYDROGEN
ABSORBED BY THE FEED
Filed April 29, 1960
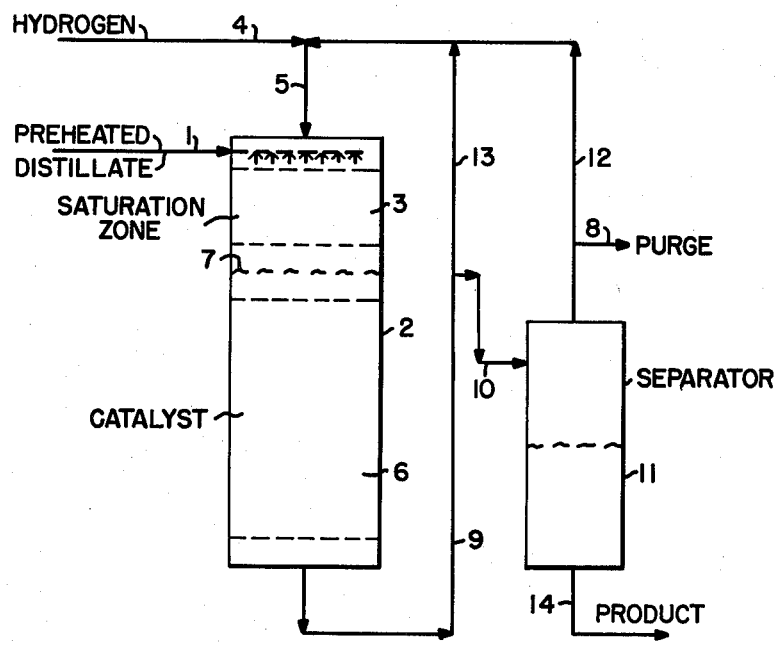
Monophining
Norton H. Berlin
Patrick P. McCall    Inventors
By *Lee A. Strimbeck*
Patent Attorney 3,152,981
HYDROGENATION PROCESS EMPLOYING HYDROGEN ABSORBED BY THE FEED
Norton H. Berlin, Fords, and Patrick P. McCall, New Monmouth, N.J., assignors to Esso Research and Engineering Company, a corporation of Delaware
Filed Apr. 29, 1960, Ser. No. 25,716
6 Claims. (Cl. 208—264)

This invention pertains to the hydrofining of distillate hydrocarbons wherein the distillate is presaturated with hydrogen and then is contacted with a hydrofining catalyst under totally liquid phase conditions without excess unabsorbed or gaseous hydrogen being added to the reaction zone. This mono-phase or flooded bed type of hydrofining is herein referred to as Monophining (proprietary name of Esso Research and Engineering Company).

The mild catalytic hydrogenation or hydrofining of oils, especially petroleum oils, to improve such properties as odor, color, sulfur and nitrogen contents, etc. without substantial conversion of the oil is a well-established process. The catalyst usually comprises a porous base such as an alumina, silica-alumina or charcoal, impregnated with an active hydrogenation component such as palladium, nickel, platinum, cobalt, and/or molybdenum. The active component may be in elemental form or in the form of salts, oxides, or sulfides. Normally in conventional hydrofining, the feed is admixed with sufficient gaseous hydrogen to provide a considerable excess in the reaction zone beyond that needed to obtain the desired product purity, and the admixture is passed over a catalyst in vapor phase or in a mixed vapor-liquid phase. The latter type of operation is usually carried out in a downflow "trickle" arrangement. The excess hydrogen is recovered from the product and is usually recycled.

Only a small amount of hydrogen in the order of 10 s.c.f./b. or less need to be consumed by many distillates in order to reach the desired product specifications. At the operating conditions of pressure and temperature of most hydrofining operations, the feeds customarily handled are capable of absorbing an amount of hydrogen that is considerably larger than the amount that needs to be consumed. The amount of hydrogen absorbed by a distillate increases with increasing temperatures at a constant pressure—besides increasing with increasing pressure at a constant temperature.

It has been known to presaturate feed stocks with hydrogen in a hydrofining operation, e.g., see U.S. 2,897,141 and U.S. 2,918,425. In this type of presaturation operation, however, it appears to be customary to operate with a mixed vapor-liquid phase with extra gaseous hydrogen been added to the reaction zone. Monophining is distinguished from such operations by the use of a flooded bed, i.e., more than 95% of the free volume of the catalyst bed below the liquid level maintained therein is occupied by the hydrogen saturated distillate being processed. The liquid level in the reaction zone is preferably maintained above the catalyst bed. Downflow operation is preferred.

Monophining permits substantial economies to be realized in the hydrofining operation. Treat gas rates are at a minimum. Also, improved contacting efficiency is seen, especially in large sized units where by-passing of unconverted material is minimized. Thus, the catalyst is more fully utilized and a smaller amount of catalyst can be used as compared to mixed phase units. Because of its contacting efficiency, Monophining can be used as a final "touch-up" stage in a process consuming a considerable amount of hydrogen and using one or more conventional reactors, to assure that none of the feed escapes treatment.

The improved contacting obtained in Monophining is also valuable from another standpoint. It minimizes the magnitude of "scale-up" problems when designing plants on the basis of pilot plant data. A contacting "safety factor" is normally used when designing commercial plants, and as much as 20 to 40% or more of the extra catalyst volume usually placed in a design can be eliminated because of the improved, more reliable and less variable flow patterns of the Monophining flooded bed operation.

A description of the drawing attached to this specification and the following discussion will serve to make this invention clear. The drawing is a simplified flow plan of one embodiment of this invention.

In the drawing, the distillate feed is introduced into the reaction zone 2 by line 1. It first enters a saturation zone 3 which may contain suitable packing to assure good contacting between the hydrogen and the distillate. Hydrogen is supplied to the saturation zone 3 via lines 4 and 5. After having become saturated with hydrogen by assimilation of the maximum amount of hydrogen that can be dissolved in or physically absorbed by the feed stock under the temperature and pressure conditions prevailing, the hydrogen-containing distillate passes on down to the lower portion of reaction zone 2 which contains a fixed bed 6 of hydrofining catalyst. The liquid level 7 of the distillate is maintained near the top or above the catalyst bed in order to assure liquid phase or flooded bed conditions. Some normally gaseous products will be liberated during the hydrofining reaction. These are absorbed in the reaction zone and removed from reactor 2 with the product.

The hydrofined product is removed from the base of zone 2 by line 9 and passes through an overflow arrangement and line 10 into a separator 11. As illustrated, a simple overflow, balance line arrangement is used to maintain liquid level 7. This can be replaced with suitable control valves if desired.

Hydrogen is recovered from the product in separator 11 and is returned by line 12 to line 5. Hydrogen can be purged from the recycle system by line 8. A "once-through" hydrogen operation can also be used if desired. Line 13 is connected to the junction of lines 9 and 10 to prevent syphoning of the reactor liquid into the separator. It may be desirable to cool the liquid product in line 10 or in the separator 11 to permit more hydrogen to be separated. The substantially hydrogen-free product is removed from separator 11 by lines 14 and passed to further processing. It can for example be let down in pressure and then stripped.

Downflow operation is illustrated for zone 2. It will be appreciated that an upflow operation can be used if desired with the saturation zones and the catalyst bed being in separate containers or the hydrogen saturated distillate can flow through the catalyst bed in the horizontal direction. While a separate hydrogen saturation zone is illustrated and preferred, the upper portion of the catalyst bed can be used as the saturation zone, with the liquid level being maintained below the top of the bed. This manner of operating is desirable for converting existing hydrofiners to Monophiners.

In conventional hydrofining, the excess of hydrogen present in the vapor phase serves to keep the distillate being treated saturated with hydrogen as hydrogen is consumed in the reaction. The distillate is hydrogenated on the catalyst surface primarily by the dissolved hydrogen and the vapor phase hydrogen contributes little to the reaction at this point, serving only to replace hydrogen that is consumed. Higher pressures favor Monophining because the amount of hydrogen absorbed is increased and thus the depletion of hydrogen during the reaction is offset. Research work so far has shown that, for a particular distillate wax stock, Monophining on a commercial scale is superior to conventional hydrofining at 800 p.s.i.g. and temperatures between 475° F. and 600° F. because of improved contacting.

Equilibrium conditions are reached faster in Monophining because of the improved contacting, but the equilibrium level reached, generally speaking, becomes poorer as the pressure is decreased because the absorbed hydrogen being consumed is not being replaced as is the case with conventional hydrofining. Catalyst activity maintenance in Monophining is essentially the same as that for hydrofining. Catalysts have been used as long as 600 hours in pilot plant Monophining tests with no appreciable activity decline.

Table I presents a range of operating conditions used in this invention and sets forth a specific example.

Table I

| | Range | | Example |
|---|---|---|---|
| | Broad | Preferred | |
| Hydrocarbon Distillate [1]: | | | |
| IBP, °F | >70 | >450 | 700 |
| FBP, °F | <1,050 | <850 | 900 |
| Sulfur, Wt. Percent | 0 to 10 | <2 | 0.02 |
| Color, TR | | | 14¼ TR |
| USP Acid | | | 25 |
| Hydrogen Saturation Zone: | | | |
| Hydrogen Purity, Mole Percent | >70 | >90 | 100 |
| Total Pressure, p.s.i | >100 | 400 to 2,000 | 800 |
| Liquid Feed Rate, v./v./hr | | 0.1 to 15 | 1 |
| Temperature, °F | 200 to 700 | 200 to 600 | 475 |
| Hydrogen Absorbed, s.c.f./b. (at 800 p.s.i.g. and 550° F.) | >5 | >25 | 40 |
| Packing Surface Area Available, Sq. Ft./Bbl | | | (²) |
| Reaction Zone: | | | |
| L/D Catalyst Bed | | >1 | 20 |
| Temperature, °F | 200 to 700 | 200 to 600 | 475 |
| Total Pressure, inlet, p.s.i | >100 | 400 to 2,000 | 800 |
| Liquid Feed Rate, v./v./hr | | 0.1 to 15 | 1 |
| Hydrogen Consumption, s.c.f./b. | | <5 | 2 |
| $C_3$-Conversion, Wt. Percent | | <3 | 0 |
| Yield, Wt. Percent on Fresh Feed | 80 to 100 | >95 | 100 |
| Bed Free Volume, ft.³/ft.³ of Catalyst | >25 | >40 | 50 |
| Percent Bed Free Volume Occupied by Liquid, Below Liq. Level | >95 | >98 | 100 |
| Catalyst (Active Hydrogenation Component, Impregnated on Porous Base) [4]: | | | |
| Surface Area, m.²/gm³ | | | 264 |
| Avg. Pore Diameter, A.³ | | | 68 |
| Percent Active Component | | | 16.4 |
| Avg. Bulk Density, gm./cc | | | 0.69 |

[1] San Joaquin heavy wax.
[2] ⅛" Stainless steel packing (glass still packing) 2" ID x 8" deep.
[3] Method of Brunauer, Emmett and Teller, Journal of the American Chemical Society, 60, 309 (1938).
[4] See S.N. 814,973 (K. K. Kearby), filed May 22, 1959, for description of preparation of spray dried alumina (100% gamma) base, up to point of impregnation of metal components. The method of impregnation of U.S. 2,898,309 was used. Chemical constituents: (wt. percent dry basis, on alumina base) Molybdena as $MoO_3$—12.9, Cobalt as $CoO$—3.5, $Na_2O$—0.06, $SO_4$—1.2, Fe—0.03, $SiO_2$—0.1. Catalyst was used in the form of ¹⁄₁₆" extrudates and was presulfided by contact with 3 vol. percent $H_2S$ in hydrogen at 0.32 s.c.f./hr. for 10 hours per 100 cc. of catalyst, at 600° F. and 600 p.s.i.g. in absence of liquid.

A process variable study for a "side-by-side" comparison of Monophining with conventional hydrofining was made. The wax stock identified in Table I was used as feed. It was desired to improve the color and USP acid number of the stock. A +30 Saybolt color and a less than 5 USP acid were considered to be satisfactory. The same equipment was used for both sets of runs. The equipment was alternated between hydrofining and Monophining for periods of 50 hours or longer, simply by permitting the liquid level to rise above or fall below the catalyst bed, and hydrogen to flow through the equipment during the conventional hydrofining. Twin reactors were also used. The conditions used in the runs are indicated in the example of Table I, except for the changes noted in Tables II and III. Tables II and III give the results of these comparative and process variable studies.

Table II

| | Hydrofining [1] | | Monophining | |
|---|---|---|---|---|
| | Color, Saybolt | USP Acid | Color, Saybolt | USP Acid |
| Feed (S.J. Hvy.) | 14¼ TR | 25 | 14¼ TR | 25 |
| Conditions: 600° F., 600 p.s.i.g., 100% $H_2$— | | | | |
| 1 v./v./hr | +27 | 5–6 | +22 | 6 |
| 3 v./v./hr | +22 | 5–6 | +22 | 6 |
| 5 v./v./hr | +18 | 6–7 | +22 | 6 |
| 6.7 v./v./hr | | | +22 | 6 |
| 10 v./v./hr | | | +18 | 8 |
| 15 v./v./hr | | | +15 | 10 |

[1] Treat gas rate of 500 s.c.f./b.

Table III

| | Hydrofining | | Monophining | |
|---|---|---|---|---|
| | Color, Saybolt | USP Acid | Color, Saybolt | USP Acid |
| Conditions: 800 p.s.i.g., 1 v./v./hr.— | | | | |
| 600° F | +31 | 3 | +30 | 3 |
| 500° F | ¹ +35 | 2 | ¹ +35 | 3 |
| 475° F | ¹ +35 | 3 | ¹ +35 | 3 |

[1] Saybolt color scale extended by new ¼" disk color standard (available from Fisher Scientific).

The tables show that higher operating pressures favor Monophining. It can be seen from Table III that the desired color and acid number were readily attained by Monophining. For obtaining color improvement with this particular wax, temperatures in the order of 450–500° F. are preferred. Other studies have also shown that Monophining is superior to hydrofining at higher space velocities where the effect of by-passing in conventional hydrofining becomes more critical. Higher space velocity operations permits a considerable savings in equipment investments.

The catalyst can be revivified in Monophining as is necessary by known methods such as burning with air-inert mixtures, steam-air mixtures, washing with the solvent, stripping, or the like. The maintenance of a liquid phase in the catalyst bed will in itself tend to free the catalyst of deposits and prolong catalyst life.

Staged operations with intermediate hydrogen absorption zones can be used. This staging is particularly useful when the feed requires in the order of 50 to 1000 s.c.f./b. of hydrogen to meet product specifications. Also, gases such as $H_2S$ can be separated from the reaction product between stages.

While Monophining is designed to handle primarily relatively clean distillate stocks, it will find use also in the processing of heavier gas oils, residuals, crudes, shale oils, synthetic oils, etc., as to desulfurize them for example. Staging is particularly helpful with these heavy stocks. Recycle of product may also be practiced if necessary to move enough absorbed hydrogen into the reaction zone to secure the desired degree of hydrogenation.

The hydrogen can be absorbed in the feed, or in the product recycle if practiced, at a pressure substantially less than the reaction zone pressure, with the hydrogen-saturated liquid then being pumped up to operating pressure. This is advantageous when the hydrogen available is at a pressure considerably less than the unit operating pressure because hydrogen compression costs are avoided.

Having described this invention, what is sought to be protected by Letters Patent is succinctly set forth in the following claims.

What is claimed is:

1. In the hydrofining of a liquid distillate over a hydrofining catalyst and at a pressure above 100 p.s.i.g., the improvement comprising first saturating said distillate with hydrogen at the temperature and pressure prevailing in a hydrogen saturation zone, then flowing said hydrogen-containing distillate in liquid phase through a reaction zone containing a fixed bed of said catalyst, the liquid phase occupying more than 95% of the available free volume of said bed, maintaining the hydrogen-containing distillate in contact with the catalyst under active hydrofining conditions until the desired hydrogenation reaction has occurred and recovering hydrogenated product from said reaction zone.

2. The process of claim 1 wherein the temperature is in the range of 200–600° F., the pressure is in the range of 400–2000 p.s.i.g., and a downflow operation is used.

3. The process of claim 1 wherein said distillate boils in the range of 450 to 850° F. and is capable of absorbing more than 25 s.c.f. of hydrogen per barrel at a pressure of 800 p.s.i.g. and a temperature of 550° F.

4. The process of claim 1 wherein distillate from said hydrogen saturation zone contains more than 25 s.c.f./b. of dissolved hydrogen, and less than 10 s.c.f./b. of hydrogen is consumed in producing said product, with the excess hydrogen being separated from said product and being recycled to said saturation zone.

5. A process for hydrofining normally liquid hydrocarbons which comprises saturating a normally liquid hydrocarbon feed with a gas containing at least 70 mol percent hydrogen in a saturation zone maintained at a temperature above 200° F. and a pressure above about 100 p.s.i., then flowing said hydrogen-containing hydrocarbon in liquid phase into one end and through a reaction zone containing a fixed bed of catalyst so that the liquid phase occupies more than about 95% of the available free volume of said catalyst bed, maintaining said hydrogen-containing hydrocarbon in contact with said catalyst under active hydrofining conditions until the desired reaction has occurred, utilizing only the hydrogen absorbed in said hydrocarbon feed without adding extraneous hydrogen-containing gas to said catalyst bed in carrying out the hydrofining treatment, withdrawing hydrofined effluent from the other end of said reaction zone, and recovering hydrofined product from said withdrawn hydrofined effluent.

6. A process according to claim 5 wherein the hydrogen-containing hydrocarbon flows downwardly over said catalyst bed and all the hydrofined hydrocarbon feed and gas are taken off from the bottom of said catalyst bed and removed as effluent, the effluent is passed to a separating zone for separating unused hydrogen from said hydrofined product and the separated unused hydrogen is recycled to said saturation zone.

References Cited in the file of this patent

UNITED STATES PATENTS

| | | |
|---|---|---|
| 2,648,623 | Porter et al. | Aug. 11, 1953 |
| 2,671,754 | De Rosset et al. | Mar. 9, 1954 |
| 2,706,167 | Harper et al. | Apr. 12, 1955 |
| 2,770,578 | Haensel | Nov. 13, 1956 |
| 2,946,742 | Rampino et al. | July 26, 1960 |
| 2,968,614 | Brooks et al. | Jan. 17, 1961 |
| 3,036,137 | Challis et al. | May 22, 1962 |